United States Patent [19]

Zeevi et al.

[11] Patent Number: 4,942,473
[45] Date of Patent: Jul. 17, 1990

[54] INTELLIGENT SCAN IMAGE SENSOR

[75] Inventors: Yehoshua Y. Zeevi, Haifa; Ran G. Ar, Kiryat Bialik; Oliver Hilsenrath, Haifa, all of Israel

[73] Assignee: Techninon Research & Development Foundation, Echnion City, Israel

[21] Appl. No.: 213,596

[22] Filed: Jun. 30, 1988

[30] Foreign Application Priority Data

Jul. 16, 1987 [IL] Israel ............................ 83213

[51] Int. Cl.$^5$ ........................................... H04N 3/14
[52] U.S. Cl. ............................. 358/213.26; 358/209
[58] Field of Search .......... 358/209, 213.11, 213.26, 358/213.28, 212, 217

[56] References Cited

U.S. PATENT DOCUMENTS

| | | | |
|---|---|---|---|
| 2,904,629 | 9/1959 | Scherbatskoy | 358/217 |
| 3,002,125 | 9/1961 | Stevens et al. | 358/217 |
| 3,429,990 | 2/1969 | Hobrough | 358/217 |
| 4,041,401 | 3/1977 | Presti | 358/212 |
| 4,625,242 | 11/1986 | Baumberg | 358/209 |

*Primary Examiner*—Jin F. Ng
*Assistant Examiner*—Stephen Brinich
*Attorney, Agent, or Firm*—Ladas & Parry

[57] ABSTRACT

An intelligent scan image sensor including a two-dimensional solid-state array of addressable imaging cells arranged for exposure to an image, where each cell includes a photosensitive diode and a sample and hold unit. The diode accumulates an electrical quantity having a value in relation to the image light intensity falling thereupon during successive integration periods and the sample and hold unit repeatedly samples and stores the accumulated quantities as analog video data values at the end of each of the successive integration periods.

20 Claims, 5 Drawing Sheets

INTELLIGENT SCAN IMAGE SENSOR

FIELD OF THE INVENTION

The present invention relates to computer vision, more particularly, to a two-dimensional imaging chip associated with a video input device for application in an intelligent scan imaging system.

BACKGROUND OF THE INVENTION

In conventional image processing systems, a raster scan video camera is provided for use with raster scan image processing techniques. Examples of these are conventional vidicon cameras and two-dimensional CCD sensing arrays, each of which is designed for predetermined sequential scanning of the pixels in the rows and columns which constitute the lines of the photosensitive surface. Sequential scanning provides sequential data, with the result that an entire frame must be scanned one line at a time before the next frame begins.

In many applications, the image consists of a lot of useless information. For example, in computer vision systems for industrial control applications, the edges of a single object on a conveyor belt must be traced by an identifying and positioning system, and all that is necessary is a small neighborhood of pixels around the edges of the object. A high speed target tracking system is another example. In the latter, due to the sequential nature of the video camera operation, much time is wasted scanning and processing the background image, while this time could be better spent rescanning the target itself, which is moving in space between successive frames.

In previous and related Israel patent application No. 79485 filed July 21, 1986, commonly owned by the owners of the present application, there was described a random scan imaging system including a coordinated image processor capable of scanning the image and processing it in an order that is not defined in advance. The system relies on a number of stored scan patterns which are translated into horizontal and vertical deflection signals for the electron beam of a vidicon TV camera. The processing algorithms, specific to the application, define the paths of scanned pixels either statistically or even in a dynamic manner, thereby eliminating redundant scanning.

Miniaturization techniques would make two-dimensional CCD sensing arrays (such as Fairchild CCD222) attractive as a replacement for the vidicon camera in the random scan imaging system application, because of their higher reliability, lower cost, lower supply voltage and power requirements, and reduced sensitivity to mechanical vibration. However, the applicability of these types of sensors is limited by the basic chip architecture which is designed and built for sequential, not random scanning. That is, since CCD arrays are basically a series of shift registers each of which incorporates a series of photodetector cells, the data must be shifted out sequentially, one data value at a time. As mentioned earlier, this is time inefficient not to mention the tremendous amount of hardware required by the image preprocessor to handle all of the pixel data, much of which is irrelevant.

For example, if image resolution of 1000×1000 is desired over a wide field, conventional image processing techniques would call for an image sensor design utilizing 1 million pixels. If each pixel has just one bit of information, there are 2 to the power 10 to the 6th combinations that can exist, which is an enormous and unwieldy number. Several image processing techniques have been proposed for sorting pixel data and attempting to improve the efficiency with which image preprocessors operate.

In one case, a processor chip architecture has been discussed which allows a group of regional pixels to provide a neighborhood transform containing data about regions of the input image, as described in the paper by Riesenbach et al entitled, "A VLSI Architecture for Real Time Image Processing", published in the proceedings of the IEEE International Conference on Computer Design, October 1986. However, these and other processing techniques require sequential raster scanning and do not eliminate the overall hardware and time constraints outlined above.

There is also known in the prior art an image sensor using a dynamic random access memory, as disclosed in U.S. Pat. No. 4,441,125, issued April 3, 1984 to Parkinson. This device is based on a modification to a commercially available random access memory chip. Normal RAM construction uses a light-tight opaque package to restrict light from impinging on the memory cells. By virtue of the modification, light is directed via lenses to impinge on the memory cells and alter their digital data states which are representative of the light image. However, since the data states are digital, this approach does not provide information about the absolute level of the light intensity, rather about a threshold level only. Further, the patent does not disclose a random access technique of scanning, relying on the sequential raster scan mode instead.

A random scan image sensor has been proposed in the prior art in a paper entitled "Charge-Injection Imaging: Operating Techniques and Performance Characteristics", by H. K. Burke and G. J. Michon, published in the IEEE Transactions on Electron Devices, volume ED-23, pages 189-195, February 1976. The charge injection device (CID) consists of two neighboring MOS capacitors. Photo-generated charge accumulates in the MOS inversion region under the charged electrodes. When the voltage is set to zero on both electrodes, the accumulated charge is no longer held in place and is "injected" into the substrate, thus resetting the device in preparation for successive accumulation.

Since the functions of charge accumulation and memory are performed by the same device, the light sampling and readout processes are coupled together very tightly. This introduces problems in the accuracy of the device, since the readout process does not suspend the sampling process, and light continues to induce charge even after the end of the sampling period.

Therefore, it would be desirable to provide an intelligent scan image sensor designed to fully exploit the capabilities of a random scan imaging system in eliminating irrevelant image information and achieving greater efficiency in the operation of image preprocessor algorithms.

SUMMARY OF THE INVENTION

Accordingly, it is a principal object of the invention to overcome the disadvantages of prior art two-dimensional image sensors and processing systems and provide a relatively inexpensive, two-dimensional intelligent scan image sensor for use in an intelligent scan imaging system. The inventive image sensor allows random access to analog pixel data values at the sensor level so as to furnish the relevant image data for a particular image scan algorithm, thereby reducing substantially the amount of hardware and processing time in the design of the image preprocessor.

According to the invention, there is provided an intelligent scan image sensor comprising:

a two-dimensional solid-state array of addressable imaging cells arranged for exposure to an image, each cell comprising a photosensitive diode and a sample and hold unit, the diode accumulating an electrical quantity having a value in relation to the image light intensity falling thereupon during successive integration periods, the sample and hold unit being operable to repeatedly sample and store the accumulated quantities as analog video data values at the end of each of the successive integration periods;

row and column selector switches each respectively associated with one of the two array dimensions; and a video output asmplifier operative with the selector switches for providing the video data values in random access fashion during a readout operation, the video data values being selectably gated onto a single output bus of the cell array by the row and column selector switches, the single output bus feeding the video output amplifier wherein the video data values are accessable in the readout operation independent of the repeated sampling operation.

In a preferred embodiment, the intelligent scan image sensor is provided as a solid-state imaging chip having an architecture in which an addressable array of photodiodes is arranged in a design similar to that of a random access memory. The pixel video value corresponding to each of the diodes is obtained through a periodic sampling process which stores the pixel value at the end of an integration period and until the end of the next period in the sample-and-hold unit of each cell. During the integration period, the sample-and-hold unit may be probed one or more times as part of an independent readout process under the direction of an image processing algorithm incorporated in a random scan imaging system. Thus, the image processing is decoupled from the video sampling rate, allowing the latter to be dynamically and independently modified.

A feature of the imaging chip architecture is that the video output amplifier permits selectively variable amplification of the pixel video values on a cell-by-cell basis.

The imaging chip architecture may be designed in accordance with particular resolution requirements which are in turn determined by the imaging cell size based on the area of the photodiode and associated circuitry.

Another feature of the invention is the provision of a packaging arrangement in which a light-transmissive window is affixed adjacent the photodiode array. Opaque layers of material are appropriately situated to cover non-photoactive areas of each of the imaging cells in the array, thereby minimizing stray light reflections which may otherwise introduce noise.

In another embodiment of the invention, an intelligent scan image sensor is provided comprising a plurality of imaging chips coupled as a network via a coherent fiber optic bundle which is terminated in an imaging optics arrangement, thereby offering increased resolution capacity by efficiently integrating the optical and processing tasks.

Additional features of the invention will become apparent from the drawings and the description contained hereinbelow.

BRIEF DESCRIPTION OF THE DRAWINGS

For a better understanding of the present invention with regard to the embodiments thereof, reference is made to the accompanying drawings in which like numerals designate corresponding elements or sections throughout, and in which.

DETAILED DESCRIPTION OF THE PREFERRED EMBODIMENTS

Figure 1:
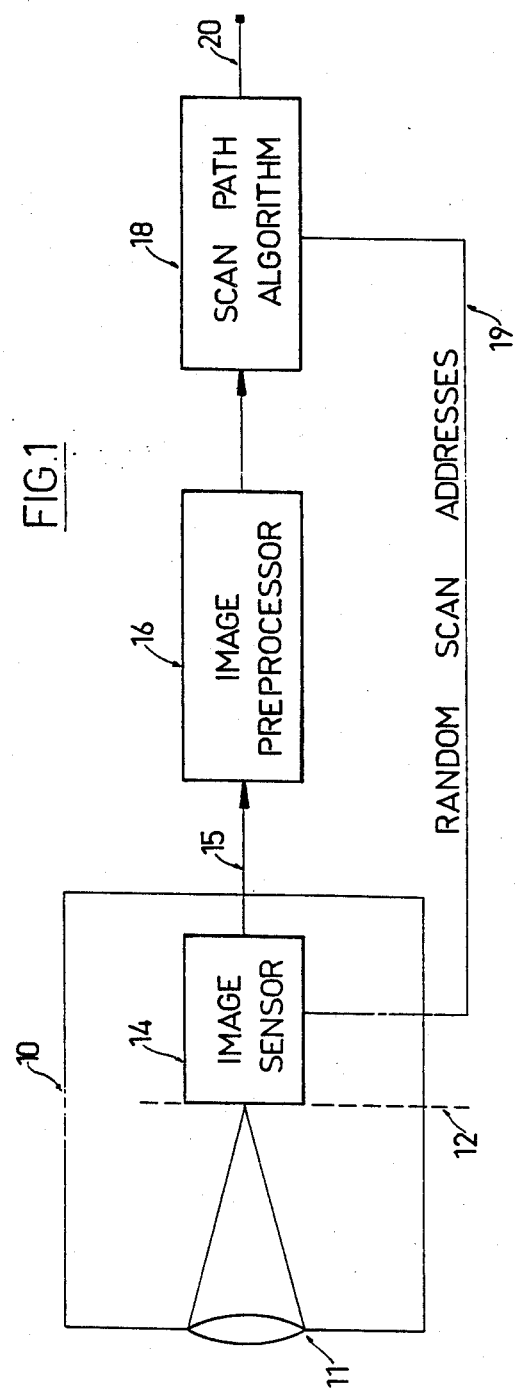
FIG. 1 is an overall block diagram of a random scan system incorporating the intelligent scan image sensor of the present invention.

Referring now to FIG. 1, there is shown an overall block diagram of a random scan system incorporating the intelligent scan image sensor of the present invention. The system comprises a camera 10 having an optical arrangement defined by a lens 11, a focal plane 12, an intelligent scan image sensor 14, an image preprocessor 16 and a random scan path algorithm 18. Image sensor 14 is disposed in focal plane 12 and feeds video data 15 to image preprocessor 16 for use by random scan path algorithm 18, which evaluates the video data 15 and selects the future addresses of the random scanning pattern which are provided to image sensor 14.

The use of scan path algorithm 18 as part of a random scan technique is described more fully in previous and related Israel patent application No. 79485, filed July 21, 1986, which is commonly owned by the owners of the present application. The system output signal 20 contains streamlined image information for use in further processing, such as is required for data reduction purposes, which is not part of the present invention.

Figure 2:
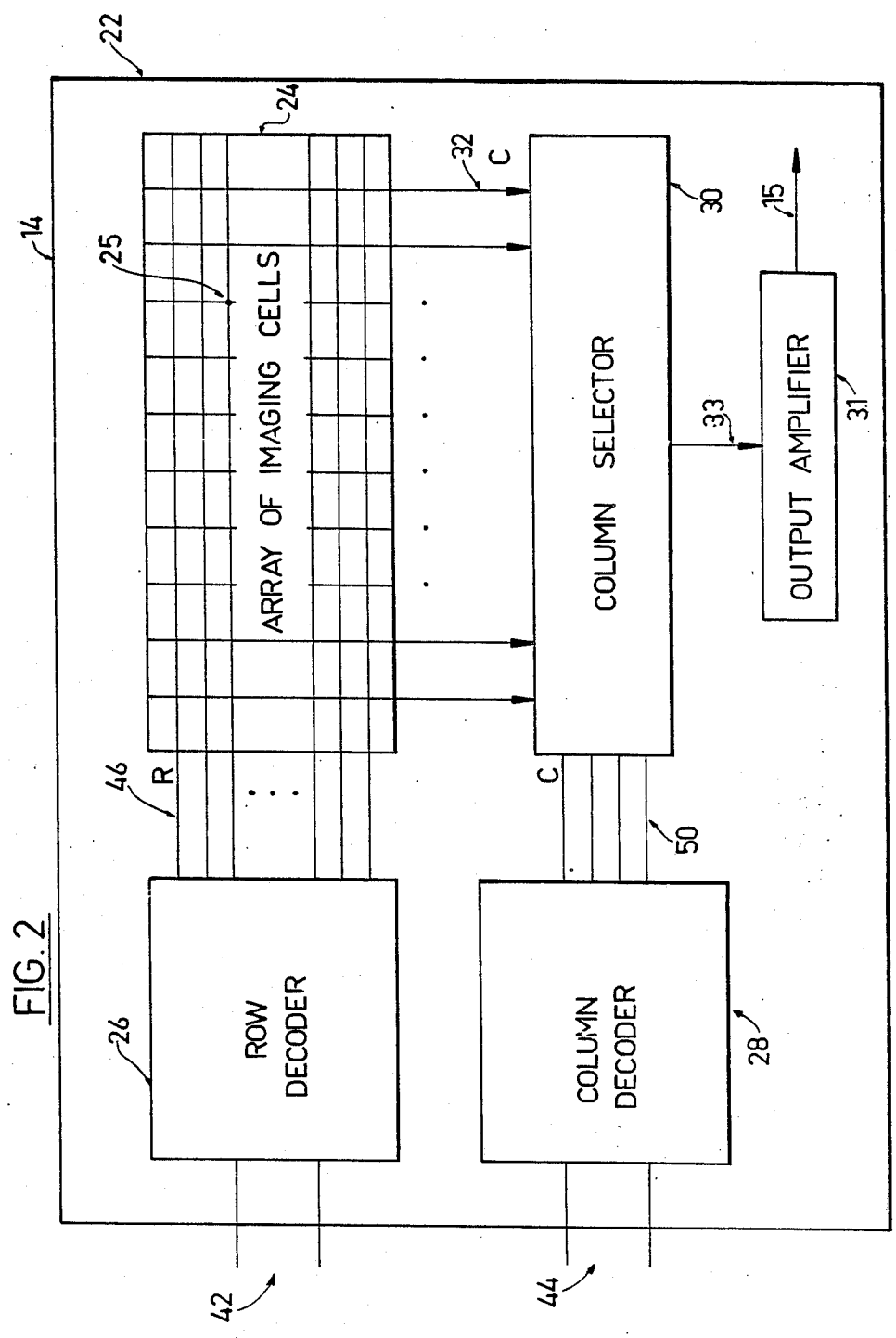
FIG. 2 is a block diagram of the overall intelligent scan image sensor featuring the imaging chip architecture.

Referring now to FIG. 2, there is shown an overall block diagram of a preferred embodiment of the image sensor 14 of the present invention, arranged as an imaging chip 22. Imaging chip 22 is comprised of a two-dimensional array 24 of R rows and C columns of imaging cells 25 which occupy most of the physical area of chip 22. Also located on chip 22 and associated with array 24 are circuitry elements comprising a row decoder 26, a column decoder 28, a column selector 30 and a video output amplifier 31. The combination of array 24 and circuitry elements 26–31 provides image sensor 14 of the invention with unique capabilities not currently obtainable in the prior art.

As described further herein, the general operation is such that each of imaging cells 25 comprises a photodiode which responds to light from an input image which passes through a light-transmissive window (not shown) and impinges thereupon. The photodiode integrates the video value of the image over an integration period and each imaging cell 25 is individually sampled for its pixel video value at the end of the integration period as part of a periodic sampling process. The sampled video value is held as an analog value in a local sample-and-hold unit. By means of an independent readout operation described further herein, row and column decoders 26 and 28 and column selector 30 are used to access these pixel video values via column bus lines 32 and output bus 33 through video output amplifier 31 in accordance with the instructions of an image processing algorithm, in a manner similar to that used with a random access memory.

Figure 3:
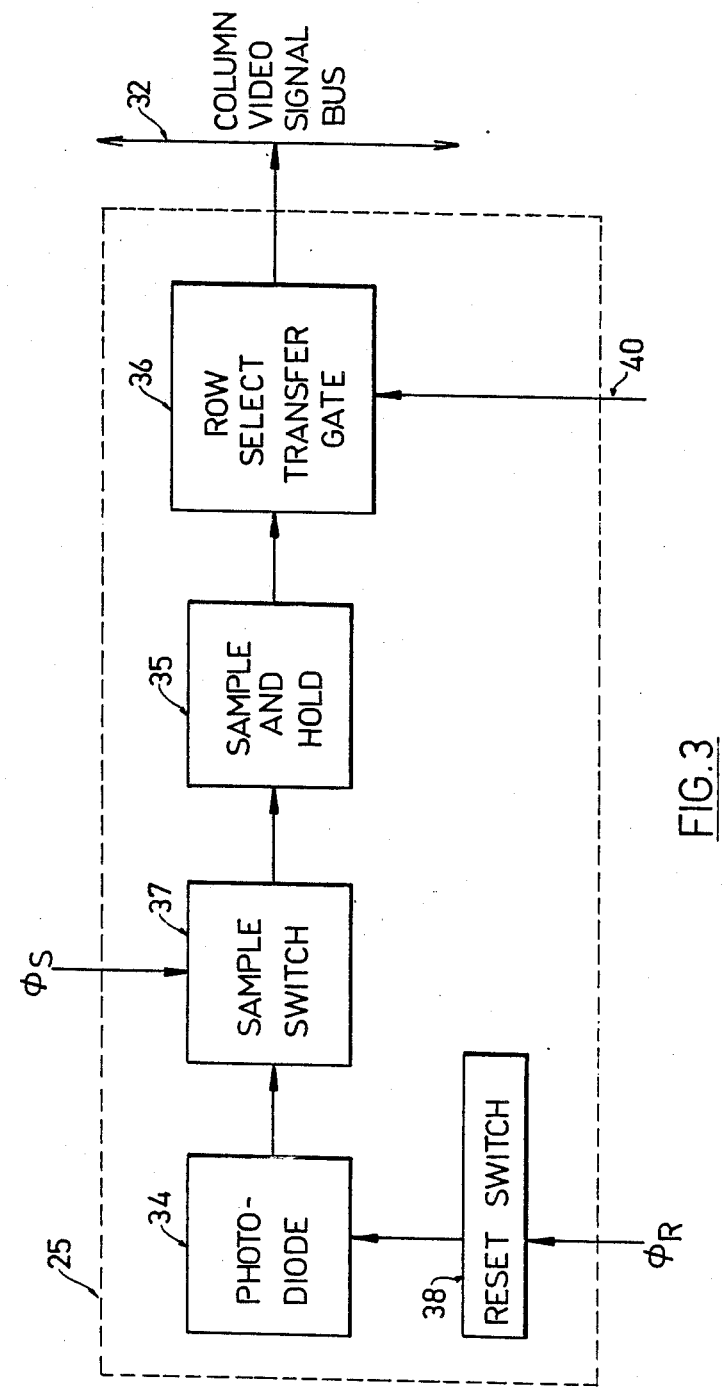
FIG. 3 is a block diagram of the imaging cell architecture used in the image sensor of FIGS. 1 and 2.

Turning now to FIG. 3, there is shown a block diagram of the imaging cell 25 architecture used in the image sensor 14 of FIG. 2. Each imaging cell 25 comprises a photosensitive diode 34 which is precharged to some predetermined voltage by depositing a charge on its inherent junction capacitance. Thereafter during the integration period, this pre-charge is discharged relative to the light intensity and the length of the integration period. Imaging cell 25 further comprises a sample-and-hold unit 35 and a row select transfer gate 36.

In operation, when the integration period is over, a sampling signal $\phi_S$ is applied to sample switch 37 to cause the accumulated charge on diode 34 to be switched out to sample-and-hold unit 35. Once this is done, pre-charge reset switch 38 applies pre-charge signal $\phi_R$ to establish the inherent junction capacitance of diode 34 at a known value. Thus, once the pixel video value is sampled, the "hold" part of sample-and-hold unit 35, comprising the memory portion of each cell 25, is immediately refreshed.

Figure 4:
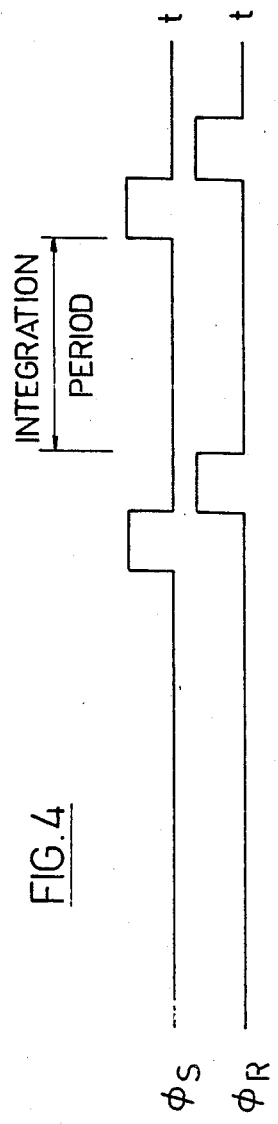
FIG. 4 is a timing diagram used in connection with the operation of the imaging cell of FIG. 3.

FIG. 4 shows a timing diagram indicating the relationship of the sampling and pre-charge signals $\phi_S$ and $\phi_R$. The integration period is shown as the time between the last pre-charge signal and the succeeding sampling signal.

The sample-and-hold unit 35 is designed to include the necessary amplification in order to hold the analog pixel value until the end of the next integration period. The output of sample-and-hold unit 35 is connected to the video signal column bus 32 via row-select transfer gate 36 which, in response to a row select signal 40 on one of the row select lines 46 (FIG. 2), is operative to copy the analog pixel value stored in sample-and-hold unit 35 onto column bus line 32.

In accordance with the novel architecture of imaging chip 22, the periodic sampling and reset of photodiode 34 is carried out independently of the readout process which occurs at sample-and-hold unit 35 and row select transfer gate 36. All imaging cells 25 of array 24 are sampled at the same frequency, since the integration period must be constant over array 24. Successive sampling of the same imaging cell 25 during any given integration period will yield the same value as that obtained in the first of such samplings. Thus, image processing is decoupled from the video sampling rate, allowing the latter to be dynamically and independently modified according to overall lighting conditions, ambient temperature, and other factors.

Referring again to FIG. 2, the architecture of imaging chip 22 provides the circuit elements comprising row and column decoders 26 and 28 and column selector 30 in the form of digital selector switches. Row and column decoders 26 and 28 are operable in response to externally provided address signals via inputs 42 and 44, which address signals are computed by an image processing algorithm, in particular by the scan path algorithm 18 of FIG. 1. In accordance with these address signals, imaging chip 22 provides the pixel values of corresponding portions of array 24 for readout at video output amplifier 31.

In operation, when it receives an address signal via row address lines 42, row decoder 26 selects from the R row select lines 46 by acting as an r-to-R decoder, where $R=2^r$, with r=number of row address lines 42. Only one of the R row select lines 46 is activated at one time. Given an r-bit sample row number k, the C video signal column bus lines 32 corresponding to the C columns of array 24 carry the contents of the $k^{th}$ row.

Column decoder 28 selects from the C column select lines 50 by acting as a c-to-C decoder, where $C=2^c$, with c=number of column address lines 44. Only one of the C column select lines 50 is activated at one time. Given a c-bit sample column number m as input 44, the contents of the m column are selected by column selector 30, and these are gated onto the single output bus 33 which feeds video output amplifier 31. A sample-and-hold stage in video output amplifier 31 stores the pixel value supplied by output bus 33, for readout purposes in connection with the continuous operation of the image preprocessor 16 of FIG. 1.

It will be appreciated that the architecture of imaging chip 22 allows random access to any of the pixels required by an image processing algorithm (such as scan path algorithm 18) for obtaining the revelant image data at the sensor level, thereby reducing substantially the amount of hardware and processing time in the design of the image preprocessor 16. Since not all of the pixels need to be scanned, the frequency of scanning may be increased which allows for faster image updates and detection of faster image changes.

It is to be noted that no timing signals are necessary in the readout of the pixel video values stored in the imaging cells 25. When new row and column addresses are supplied to imaging chip 22, a new pixel video value is retrieved and presented at video output amplifier 31. Until then, the previously examined pixel video value is valid at the sample-and-hold stage of the output amplifier 31 and transition between successive pixel video values is continuous.

It is a particular feature of the present invention that video output amplifier 31 provides amplification of the pixel video values for purposes of driving the connection pins of imaging chip 22 and the external circuitry connected thereto. This amplification can be made selectively variable on a cell-by-cell basis according to the requirements of the readout operation. For a given amplification level, this provides a dynamic range of light intensity resolution per pixel up to 1:256 for 8-bit A/D conversion external to the imaging chip 22. By varying the level of amplification of the output amplifier 31, this dynamic range may be increased.

Additional global signals are fed into the imaging chip 22 and are intended to support the operation of imaging array 24, such as supply voltages, reference voltages, and sampling and pre-charge clocks. These are described in connection with the equivalent circuit for imaging cell 25 shown in FIG. 5.

Figure 5:
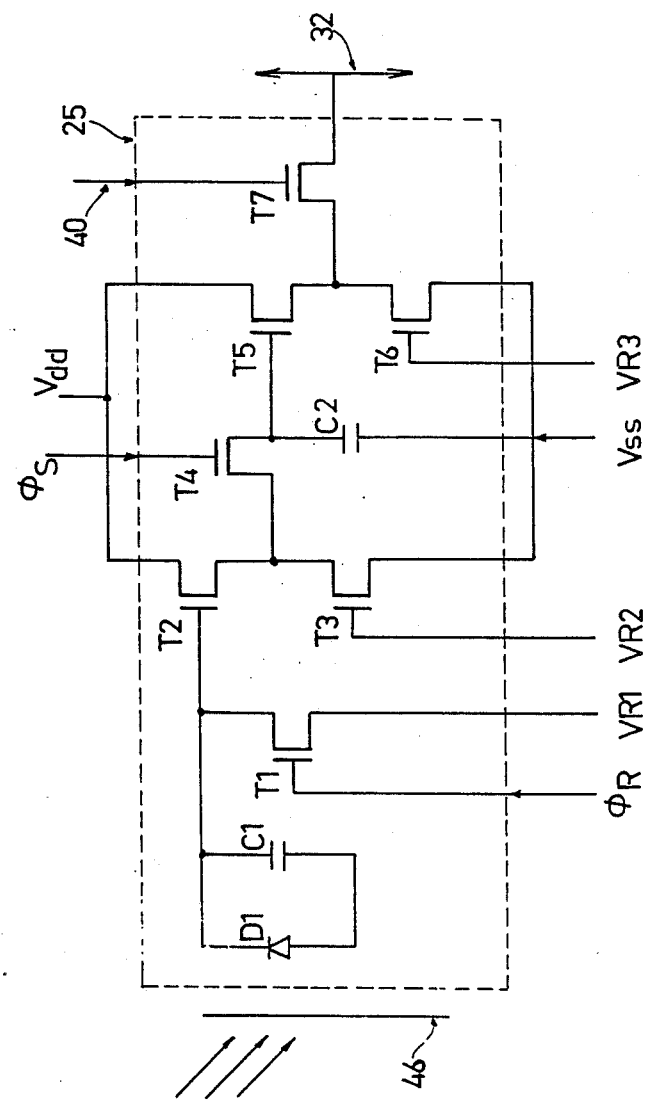
FIG. 5 is an equivalent circuit diagram of a preferred embodiment of the imaging cell shown in FIG. 2.

Referring now to FIG. 5, the equivalent circuit for imaging cell 25 comprises four types of circuit elements: photodiode D1, seven FET transistors T1–T7, inherent diode junction capacitance C1 and fabricated capacitance C2, and incident power supply and signals lines. The circuit elements can be fabricated using standard MOS microelectronic solid-state technology as applied to the manufacture of VLSI digital circuitry.

The photodiode D1 is fabricated as a large junction, such as is generated under a large area of diffusion. Packaging arrangements may vary, but will necessarily include a light-transmissive window 46 (possibly combined with lens 11) above the diode array 24. Since light impinging on the diode array 24 may also affect the sample-and-hold circuitry 35 located nearby, an opaque layer such as metal, will preferably cover the non-photoactive area of each cell 25.

The transistor T1 is the reset switch 38 which is operated by pre-charge signal $\phi_R$ in relation to the pre-charge reference voltage signal VR1. Transistors T2 and T3 comprise a source follower buffering amplifier of the pixel video value which copies the video value to capacitor C2. Transistor T4 is the sample switch 37 which is operated by sampling signal $\phi_S$ and C2 is the "hold" capacitance for holding the sampled pixel video value. Transistors T5 and T6 provide a second source follower buffering amplifier which is used to drive the long, high capacitance video signal column bus 32.

After leaving transistor T7, which is the row select transfer gate 36 used in the readout operation, the video signal passes through a switching transistor in the column selector 30, and then into the output video amplifier 31.

The external signal and supply lines may be arranged to criss-cross the array 24, and two layers of metal for the signal lines may be employed for this purpose. The external signal lines incident with each imaging cell 25 include the two supply lines Vdd and Vss, one sampling signal $\phi_S$ and one diode pre-charge $\phi_R$ clock line, photodiode reference VR1, row select signal 40, and the two reference voltage lines VR2 and VR3 for the source follower buffering amplifier transistors T3 and T6 inside the sample-and-hold circuit 35.

It should be noted that in the case of fabrication as a physically large array 24, the image sensor 14 of the present invention may function even in the presence of defects. First, pixel, row or column defects may be treated as noise and eliminated by most computerized image processing algorithms. Second, in random scan systems, where external logic of the image processing algorithm controls the specific pixels examined, defective areas of array 24 can be ignored in a programmed manner so that they are never scanned.

The physical layout of imaging chip 22 can be estimated based on the equivalent circuit diagram of FIG. 5. A reasonable photodiode D1 size (including capacitor C1) is estimated at 12×12 microns, based on laboratory experiment and similar dimensions in commercial CCD devices. Based on 1.25 micron CMOS technology and an estimate of 12 square microns per FET transistor within cell 25, including the spaces and interconnections, seven transistors T1–T7 contribute 85 square microns. Capacitor C2 is estimated to require 25 square microns.

The signal and supply lines incident within cell 25 are designed to be non-intersecting at two different layers and require a channel of six parallel lines, 10 microns wide and 20 microns long, i.e. 200 square microns per cell. The overall dimensions of the chip can be estimated from the sum of the various circuit element areas, which yields approximately 415 square microns per imaging cell 25, or about 20×20 microns square. A feasible diode array 24 size of 10×10 millimeters will then contain 512×512 imaging cells 25. Which establishes the image resolution for the number of pixels. The additional area required for the digital selectors, decoders, output amplifier and input/output pads will only add about 10–20% to the area of imaging chip 22.

The size of imaging chip 22 may increase beyond 10×10 millimeters, which is permissible since, as explained above, a certain level of defects can be tolerated in the diode array 24, which is the largest single circuit element in the chip 22 area.

As described above, the relationship of the design parameters in the layout of imaging chip 22 should be considered together. Given a fixed total area, the size of each imaging cell 25 determines the overall pixel resolution. The cell size in turn is affected by two parameters, the fill factor and the level of noise or signal-to-noise-ratio. The larger photodiode D1 is relative to cell 25, the larger the fill factor and the smaller the resolution. In order to achieve higher levels of signal-to-noise ratio, larger sample-and-hold circuits are required, which results in lower fill factor, or lower resolution, or both.

In the above example, since the photodiode D1 occupies 145 square microns out of the total 415, the factor is 35%. The remaining parameters of the design outlined above include a 512×512 image resolution at 60 db signal-to-noise ratio, or 1:1000 dynamic range.

As described briefly in the background of the invention, a charge injection device (CID) has been proposed as a random scan image sensor in the prior art as described by Burke an Michon. For comparison purposes with regard to the invention, further details of the CID approach are now considered.

The CID construction is such that in a two-dimensional array, one of the two electrodes of each device is connected to a certain row conductor and the other electrode is connected to the column conductor. The contents of the device, i.e. the level of accumulated charge, is sensed by a process called "parallel injection". The charge stored in each twin-capacitor device is first led to concentrate under the row electrode by applying two different voltage levels to the two electrodes, so that the charge is attracted more by the row electrode than by the column electrode.

Then, the charge is forced to transfer from that row capacitor by disconnecting the column electrode so that it "floats", after which the row line voltage is switched to zero, and the charge in the corresponding device transfers from under the row electrode to under the column electrode. The column conductor changes voltage by an amount proportional to the stored charge level.

Compared to the MOS imaging chip 22 of the invention, the CID imaging cell consists of only two capacitors and thereby utilizes the silicon area more efficiently with a higher fill factor. This is due to the fact that the inventive MOS imaging cell 25 consists of, in addition to the light-sensitive devices, a sample-and-hold circuit 35 which occupies a non-light-sensitive area of the cell.

However, the relative disadvantages of the CID approach are many:

(1) The readout and light sampling processes are coupled very tightly together. Once readout is completed for some image, all charges are injected into the substrate (by switching the voltage of all electrodes to zero), and at that time readout must be stopped and suspended for the duration of the integration period. At the end of that integration period, readout may commence. However, light does not stop inducing addtional charges, and thus additional charge is being accumulated during the readout process. Furthermore, to insure uniform integration periods over all successive frames, the period available for readout is equal to the integration period, and cannot be shortened nor prolonged.

In the inventive imaging chip 22, on the other hand, light integration and image-memory readout are completely decoupled and independent processes. Light values are sampled at periodic times, and storeed in the sample-and-hold unit 35, ready to be read at any time. The stored value does not increase during readout due to the influence of additional light. The rate and order of readout is independent of the light integration period. This is due to the fact that in the inventive imager, each cell includes both a charge accumulation mechanism and an analog memory cell, whereas in the CID array each device fulfills both functions which are not separated.

(2) In detecting the specific level of light, at a very high dynamic range, a problem is presented when the light-generated charge is used to shift the voltage of the precharged, floating column line. Since there is no amplification along the way, an extremely sensitive sense amplifier is needed at the end of the bus line, rendering the design very complicated and difficult. By way of contrast, the inventive imaging chip 22 provides sample-and-hold unit 35 with the necessary amplification for driving the video signal coumn bus 32.

(3) As a result of the increased density on the chip, some of the charge generated at one cell may escape and join the charge of neigboring cells, causing crosstalk or "blooming". The lower fill factor of the inventive architecture tends to diminish this problem.

(4) Since the gate electrodes cover light sensitive, charge-collecting area, the electrodes must be transparent. This requires a specialized, expensive fabrication process. The inventive chip architecture is designed to avoid this problem.

It will be appreciated by those skilled in the art that, because fabrication of the image sensor described in FIGS. 2-5 is based on VLSI techniques as described above, the manufacturing costs can be kept within reasonable limits as this technology is widespread. However, it is in keeping with the scope of the present invention to consider alternative embodiments based on use of CCD devices, which are manufactured by a more complex, less widespread technology.

In one of the alternative embodiments, image sensor 14 may comprise two single-dimensional CCD devices, positioned perpendicular to each other and adapted for two-dimensional applications. One of the two devices is scanned along all of the cells of its pixel vector in one orientation, with the other being scanned along all of its cells in a perpendicular orientation. Instead of obtaining the video pixel value of individual pixels as in the preferred embodiment of image sensor 14, the output of each of the scanned lines is represented by a single value in an integration process, such as the sum of the individual pixel values.

Application of the random scan technique requires that only particular lines are scanned. In the CCD-based image sensor, selection between lines is achieved by a selector switch fabricated on the device. Not only are lines selectable arbitrarily, but in addition it is possible to serially read out only part of a line, thus gaining some degree of random scanning even along the second dimension. This technique is useful for determination of certain features of an image, such as the boundaries of an object, but not its shape.

Compared to the preferred embodiment of imaging chip 22, the CCD-based image sensor demonstrates advantages such as increased cell density on the chip since it uses CCD shift registers, which are more efficient and require less circuit area, per cell. Since decoding along only one dimension is required, decoders occupy less space and a smaller number of bits are required for addressing since only column numbers have to be identified, rather than both row and column numbers for individual pixels as in the preferred embodiment.

Another alternative embodiment of image sensor 14 is related to implementation of a conventional CCD device which is sequential in operation. Instead of a sequential line-by-line raster scan, however, this embodiment applies a spiral scan pass trajectory. This approach is related to knowledge of human vision wherein information is not sampled by the eye uniformly, rather it is sampled with a very high density in the center of the image, at and around the focal point, and more sparsely away from the center. The device is fabricated in a spiral architecture so that the size of the imaging cells increases and cell density decreases as a function of the distance from the center of the array to the cell, inherently achieving integration of the image data corresponding to the sparse areas.

For this embodiment, the image sensor 14 scanning sequence is directed by fabricating the conventional CCD device such that the shift registers are connected to produce a pixel sequence which follows the spiral path which expands in diameter going outward from the center or vice-versa. The advantages are high resolution only where needed, fewer pixels per chip and reduced computational load. This retina-like system allows concentrated attention to the focal point while still affording general inspection of the neighborhood.

The spiral scan pattern is also achievable in the preferred embodiment by directing the sampling sequence in a non-uniform spiral scan, depending on data that establishes the center of activity as the focal point. The intelligent scan feature enables the sequence to be interrupted by jumps to various pixels as dictated by the image processing algorithm. The intelligent scan feature further enables directing the focal point of the spiral pattern to various different areas in the image, rather than being limited to the center.

Figure 6:
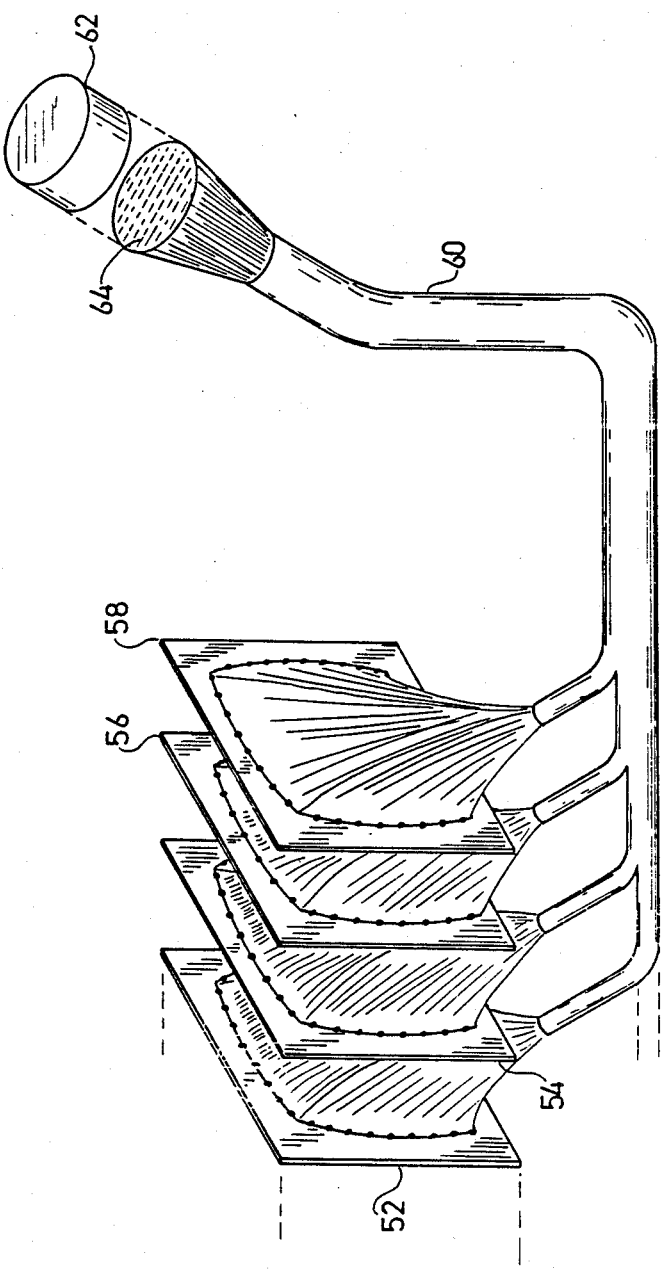
FIG. 6 is an overall view of an alternative embodiment of the intelligent scan image sensor incorporating a network of imaging chips coupled by a fiber optic bundle for increasing the image resolution.

Referring now to FIG. 6, there is shown an intelligent scan device comprising a network of individual imaging chips 52, 54, 56 and 58, each of which is similar in construction to that described above in connection with imaging chip 22. Chips 52-58 are interconnected via a coherent fiber optic bundle 60 and each receives light from an image via imaging optics 62. An image plane 64 which is defined by imaging optics 62 forms the termination point for the individual fibers in fiber optic bundle 60. Each of the fibers is teminated at one of the imaging cells 25 on chips 52-58.

The construction of imaging optics 62 and fiber optic bundle 60 are known from the medical instruments technology field, where devices such as an "endoscope" are used for invasive inspection of body organs. This type of optical arrangement provides a virtual detector for the imaging chips 52-58 at the image plane 64. The construction my be such that a given number of fibers corresponds to a single pixel so that the image resolution for a given number of pixel is known.

The intelligent scan device of FIG. 6 allows for a significant enhancement in the capabilities of the image sensor 14 described in connection with FIG. 1. This is because the network of imaging chips 52-58 offers increased resolution capacity by efficiently integrating the optical and processing tasks. In effect, the resolution capacity associated with a single imaging chip 52 (like imaging chip 22 in sensor 14) is multiplied several times over by the additional imaging chips 54, 56 and 58.

Several operating strategies are presented by the configuration of FIG. 6. Since the terminations of the individual fibers can be routed according to a predetermined design, signals from the pixels defined in the image plane 64 can be designated in a 3-dimensional fashion, by row and column with respect to each of imaging chips 52-58, and by chip number within the network.

In one approach, the routing arrangement is such as to divide the image plane 64 into several sectors, each of which is handled by a designated imaging chip of the network. For N imaging chips, this increases the resolution N-fold since the sectors of the image plane 64 can be processed in parallel, each with the resolution afforded by the capacity of an individual chip, and this can be made to vary in accordance with the fabrication techniques described earlier.

In another approach, a multi-resolution capability is achieved by having each pixel of the image plane 64 represented by an imaging cell 25 from more than one imaging chip. For example, random access to any imaging cell 25 on one imaging chip provides one level of resolution, with additional levels of resolution being provided by access to additional cells which cover virtually the same pixel on image plane 64, but which are located on another imaging chip, so that chip-to-chip accessing is possible. For low resolution capability, one imaging chip would be associated with a set of pixels largely dispersed over the image plane 64, while for high resolution, a number of imaging chips would be associated with the same set of pixels.

In still another approach, a layered arrangement is possible wherein the fibers in fiber optic bundle 60 are routed with a different pattern for each imaging chip. For example, each one of imaging chips 52-58 may be designated to correspond to a spiral, square triangular or elliptical scan pattern.

It will be appreciated by those skilled in the art that many variation in fabrication of the imaging chip of the present invention are possible. While the principles of the invention have been described with reagard to specific embodiments, it is to be understood that the description is made by way of example only and not as a limitation on the scope of the invention, which is set forth in the appended claims.

We claim:

1. A intelligent scan image sensor comprising:
   a two-dimensional solid-state array of addressable imaging cell means arranged for exposure to an image, each cell means comprising a photosensitive diode and a sample-and-hold unit, said diode accumulating an electrical quantity having a value in relation to the image light intensity falling thereupon during successive integration periods, said sample and hold unit repeatedly sampling and storing said accumulated quantities as analog video data values at the end of each of said successive integration periods;
   row and column selector switch means each respectively associated with one of said two array dimensions; and
   video output amplifier means operative with said selector switch means for providing said video data values in random access fashion during a readout operation,
   said video data values being selectably gated onto a single output bus of said array by said row and column selector switch means, said single output bus feeding said video output amplifier means wherein said video data values are accessible in said readout operation independent of said repeated sampling operation.

2. The sensor of claim 1 wherein said array is provided as a solid-state imaging chip having an architecture in which each of said imaging cell means comprises a photodiode having an inherent junction capacitance which is precharged to a predetermined voltage before each successive integration period and is discharged therein in relation to the image light intensity falling thereupon.

3. The sensor of claim 1 wherein said array is arranged in a row and column line pattern.

4. The sensor of claim 2 wherein said array is arranged in a row and column line pattern.

5. The sensor of claim 1 wherein said array is arranged in a spiral path having increasing cell size and decreasing cell density with distance from the center.

6. The sensor of claim 2 wherein said array is arranged in a spiral path having increasing cell size and decreasing cell density with distance from the center.

7. The sensor of claim 1 wherein said video output amplifier means provides selective variable amplification of said video data values on a cell-by-cell basis.

8. The sensor of claim 2 wherein said video output amplifier means provides selective variable amplification of said video data values on a cell-by-cell basis.

9. The sensor of claim 1 wherein said row and column selector switch means comprises address decoders which gate out said video data values in accodance with input address data provided in said readout operation.

10. The sensor of claim 2 wherein said row and column selector switch means comprises address decoders which gate out said video data values in accordance with input address data provided in said readout operation.

11. The sensor of claim 2 wherein the video data value corresponding to each of said photodiodes is obtained in said sampling operation and stored for the duration of each of said successive integration periods in said sample-and-hold unit of each imaging cell.

12. The sensor of claim 11 wherein said sample-and-hold unit may be probed one or more times during each of said successive integration periods as part of said independent readout operation under the direction of an image processing algorithm.

13. The sensor of claim 2 wherein said imaging chip is provided in a packaging arrangement having a light-transmissive window affixed adjacent the photodiode array.

14. The sensor of claim 1 wherein opaque layers of material are appropriate situated to cover non-photoactive areas of each of the imaging cell means in the array, thereby minimizing stray light reflections which may otherwise introduce noise.

15. A plurality of intelligent scan image sensors each according to claim 1 and interconnected as a network via a fiber optic bundle, each sensor receiving light from said image via an imaging optics arrangement which defines an image plane whereat individual fibers of said fiber optic bundle are terminated.

16. For use with a two-dimensional random scan data acquisition system, the intelligent scan image sensor of claim 1.

17. The random scan data acquisition system of claim 16 comprising a plurality of intelligent scan image sensors interconnected as a network via a coherent fiber optic bundle, each sensor receiving light from said image via an imaging optics arrangement which defines an image plane whereat individual fibers of said fiber optic bundle are terminated.

18. A method of scanning an image comprising the steps of:
    exposing a two-dimensional solid-state array of addressable imaging cell means to said image, each cell means comprising a photosensitive diode an a sample-and-hold unit, said diode accumulating an electrical quantity having a value in relation to the image light intensity falling thereupon during successive integration periods,
    operating said sample and hold unit to repeatedly sample and store said accumulated quantities as analog video data values at the end of each of said successive integration periods; and
    accessing said video data values, provided by video output amplifier means via row and column selector switch means each respectively associated with one of said two array dimensions, in random access fashion during a readout operation,
    said video data values being selectably gated onto a single output bus of said array by said row and column selector switch means, said single output bus feeding said video output amplifier means wherein said video data values are accessable in said readout operation independent of said repeated sampling operation.

19. For use with a two-dimensional random scan data acquisition system, the method of claim 18.

20. The method of claim 18 wherein a plurality of said addressable imaging cell array means are interconnected as a network via a coherent fiber optic bundle, each array receiving light from said image via an imaging optics arrangement which defines an image plane whereat individual fibers of said fiber optic bundle are terminated.

* * * * *